UNITED STATES PATENT OFFICE.

FRANCESCANTONIO ROMANO, OF FITCHBURG, MASSACHUSETTS.

COMPOSITION FOR FLOORS, &c.

1,317,525.  Specification of Letters Patent.  Patented Sept. 30, 1919.

No Drawing.  Application filed July 13, 1918. Serial No. 244,748.

*To all whom it may concern:*

Be it known that I, FRANCESCANTONIO ROMANO, a citizen of the United States, residing at Fitchburg, in the county of Worcester and State of Massachusetts, have invented a new and useful Composition for Floors, &c., of which the following is a specification.

This invention relates to an improved composition of matter which is useful chiefly as a building material.

The general object of my invention is to produce an improved material which may be used to advantage in making floors, walls and pavements, and also to take the place of stucco. A particular object is to produce a material which will be superior to the universally used Portland cement and sand mixture, in that it will not crack, will not peel or scale, will not allow moisture to seep through as readily, and will present a far more pleasing appearance.

The essence of the present invention is the substitution in the Portland cement and sand mixture of granite dust or flour for the sand. The granite dust is to be added to Portland cement in substantially the same proportions, part for part, as the sand to the cement. The proportions are usually 1 part cement and 2 parts granite dust.

In the grinding and crushing of granite a large quantity of granite dust is produced. This so-called dust is not physically a true dust, but is a mixture of particles of varying size whose dimensions are about those of the sand particles they are to replace. Granite dust is usually considered a waste product, and how to dispose of the enormous quantities which soon accumulate has been a problem. This invention not only provides a use for granite dust, but so uses it that a product of superior qualities is produced.

Granite is well known to be a solidified fusion of feldspar, quartz and mica. The feldspathic, quartz and mica particles are readily seen by the unaided eye. The crushing of granite ordinarily separates these three constituents more or less so as to yield a physical mixture of granules of feldspar, of quartz and of mica. This physical mixture is commonly known as granite dust.

Granites of course vary in composition and in fineness of grain; but it may be said that most granites consist of potash feldspar, whose formula is $2KAlSi_3O_8$, of quartz $SiO_2$ and of mica, which is a generic term for a series of complex silicates of aluminum containing potassium, magnesium, calcium, and sometimes iron. Sometimes soda feldspar $2NaAlSi_3O_8$ or lime feldspar $CaAl_2Si_2O_8$ occur in place of the more common potash feldspar.

Portland cement, which is made from lime, silica and alumina, has been proved to consist essentially of tricalcium silicate $3CaO.SiO_2$ the most important component of dicalcium silicate $2CaO.SiO_2$ and of tricalcium aluminate $3CaO.Al_2O_3$. These products when ground finely and treated with water probably suffer decomposition and form some such products as the hydrated calcium silicate $(CaSiO_3)_2.5H_2O$ and the hydrated basic calcium aluminate $Ca_4Al_2O_7.12H_2O$. The hardening of the cement after setting starts is supposed to be due chiefly to the formation of the former product.

It is well known that concrete made from Portland cement and sand develops fine cracks which later may widen with serious consequences. It is also known that concrete in thin layers is not moisture proof but allows a certain amount of water to seep through. In the course of experiments to produce a product superior to ordinary concrete, I have discovered that these faults may be eliminated by the use of granite dust in place of sand. From the results that I have obtained I am convinced that the granite dust does not merely fill the place of the sand but performs a part which sand is incapable of performing, when combined with cement. In other words, granite dust seems to combine with cement in quite a different way from sand, and yields a product which is much closer grained, is more durable, is stronger, can be worked more smoothly with a trowel, and is very much more handsome in appearance.

It is believed that the feldspar in granite dust unites chemically with certain of the constituents of the cement during the setting thereof. It is also believed that the quartz merely performs the part which sand does in concrete, quartz and sand each being essentially $SiO_2$. As for the mica particles, they seem to increase the binding action of the cement and act to prevent cracking.

Sand is of course a material which varies widely in composition and purity. Few deposits of sand exist which have not large percentages of impurities such as clay, iron oxid and vegetable matter. It is well known that even infinitesimal amounts of vegetable matter so weaken concrete that sand containing the same cannot be used in making concrete. It is also known that too large amounts of ferric oxid are not desirable. If sand is too fine grained the concrete will not stand up well under strains. These facts make all but the coarser and purer sands undesirable when making high grade concrete. By using granite dust one eliminates the uncertainties which attend the use of ordinary sand. While granite dust varies in composition as explained, it is a clean and a pure material, and does not, like sand, yield products which may vary 100 per cent. in strength.

The uses of my invention are manifold. Among them may be mentioned: in laying floors, in building exterior and interior walls, and whenever it is desired to have a high-class building material. It can be laid in varying thicknesses, usually from ⅜ to ½ inch. Mineral coloring matter is readily incorporated with the composition while being mixed, and once colored, it retains its color. The fine mica particles not only act as outlined above, but in addition impart a peculiar and distinctive appearance to my product. Each particle acts as a tiny mirror reflecting light, with the result that structures built or made from my invention shine in the light, giving a beautiful effect. It is obvious that imitation tile flooring can be laid by using my product. And in the renovation of the exteriors of old houses my product is much superior to stucco in strength, in weathering ability, in waterproof qualities, and in appearance. My product may be worked while plastic with a trowel, or may be given an emery finish when desirable.

It is to be especially noted that I disclaim the use of granite cubes or blocks or broken masses of granite with cement. I use the flour or dust attendant upon all stone working operations and always considered a useless waste product, said dust being the broken or unbroken granules or crystals of the three chief constituents of granite. Were I to use comparatively large pieces of granite I would not get the separation of the crystals which is considered vital, but would have pieces of granite each consisting of many particles of each constituent.

What is claimed is:—

1. A building material which consists of Portland cement mixed with granite dust or flour.

2. An artificial stone, which consists of Portland cement and granite dust or flour mixed with water and allowed to harden or set.

In testimony, that I claim the foregoing as my own, I have hereto affixed my signature.

FRANCESCANTONIO ROMANO.